(12) United States Patent
Sharma et al.

(10) Patent No.: US 11,761,363 B2
(45) Date of Patent: Sep. 19, 2023

(54) SYSTEM FOR CO₂ CAPTURE FROM INTERNAL COMBUSTION ENGINE

(71) Applicant: ECOLE POLYTECHNIQUE FEDERALE DE LAUSANNE (EPFL), Lausanne (CH)

(72) Inventors: Shivom Sharma, Sion (CH); François Marechal, Sion (CH)

(73) Assignee: ECOLE POLYTECHNIQUE FÉDÉRALE DE LAUSANNE (EPFL), Lausanne (CH)

( * ) Notice: Subject to any disclaimer, the term of this patent is extended or adjusted under 35 U.S.C. 154(b) by 214 days.

(21) Appl. No.: 17/289,187

(22) PCT Filed: Oct. 28, 2019

(86) PCT No.: PCT/EP2019/079442
§ 371 (c)(1),
(2) Date: Apr. 27, 2021

(87) PCT Pub. No.: WO2020/089186
PCT Pub. Date: May 7, 2020

(65) Prior Publication Data
US 2022/0010707 A1  Jan. 13, 2022

(30) Foreign Application Priority Data
Oct. 30, 2018  (EP) .................................... 18203243

(51) Int. Cl.
*F01N 3/08* (2006.01)
*B01D 53/04* (2006.01)
(Continued)

(52) U.S. Cl.
CPC ....... *F01N 3/0857* (2013.01); *B01D 53/0423* (2013.01); *B01D 53/0438* (2013.01);
(Continued)

(58) Field of Classification Search
CPC ........ F01N 3/0857; F01N 3/0205; F01N 5/02; F01N 2240/02; F01N 2240/18;
(Continued)

(56) References Cited

U.S. PATENT DOCUMENTS 9,486,733 B2  11/2016  Hamad
2003/0037672 A1  2/2003  Sircar
(Continued)

FOREIGN PATENT DOCUMENTS

CN  106582201 A  4/2017
GB  2 281 229  3/1995

OTHER PUBLICATIONS

International Search Report and Written Opinion of the ISA for PCT/EP2019/079442 dated Jan. 24, 2020, 17 pages.
(Continued)

*Primary Examiner* — Audrey B. Walter
(74) *Attorney, Agent, or Firm* — Nixon & Vanderhye P.C.

(57) ABSTRACT

System (2) for CO₂ capture from a combustion engine (1) comprising an exhaust gas flow circuit (6) having an inlet end fluidly connected to an exhaust of the combustion engine, a heat exchanger circuit (12), a primary exhaust gas heat exchanger (H1) for transferring heat from exhaust gas to fluid in the heat exchanger circuit, at least one compressor (10) for compressing fluid in a section of the heat exchanger circuit, the compressor driven by thermal expansion of heat exchanger circuit fluid from the primary exhaust gas heat exchanger (H1), and a CO₂ temperature swing adsorption (TSA) reactor (4) fluidly connected to an outlet end of the exhaust gas flow circuit. The TSA reactor includes at least an adsorption reactor unit (D4) and a desorption reactor unit (D2), the heat exchanger circuit comprising a heating section (12b) for heating the desorption unit (D2) and a cooling section (12a) for cooling the adsorption unit (D4).

27 Claims, 13 Drawing Sheets

(51) Int. Cl.
  B01D 53/26 (2006.01)
  F01N 3/02 (2006.01)
  F01N 5/02 (2006.01)

(52) U.S. Cl.
  CPC ....... B01D 53/0462 (2013.01); B01D 53/265 (2013.01); F01N 3/0205 (2013.01); F01N 5/02 (2013.01); *B01D 2253/204* (2013.01); *B01D 2256/22* (2013.01); *B01D 2257/504* (2013.01); *B01D 2259/404* (2013.01); *B01D 2259/652* (2013.01); *F01N 2240/02* (2013.01); *F01N 2240/18* (2013.01); *F01N 2570/10* (2013.01)

(58) Field of Classification Search
  CPC ............ F01N 2570/10; B01D 53/0423; B01D 53/0438; B01D 53/0462; B01D 53/265; B01D 2253/204; B01D 2256/22; B01D 2257/504; B01D 2259/404; B01D 2259/652
  See application file for complete search history.

(56) References Cited

U.S. PATENT DOCUMENTS

| | | | |
|---|---|---|---|
| 2014/0060013 A1* | 3/2014 | Dunn | F01K 23/065 60/278 |
| 2014/0230401 A1 | 8/2014 | Dunn | |
| 2016/0341472 A1 | 11/2016 | Lang et al. | |
| 2017/0106336 A1* | 4/2017 | Boulet | B01D 53/62 |
| 2017/0306825 A1 | 10/2017 | Kaneeda et al. | |
| 2018/0214817 A1 | 8/2018 | Schurer | |

OTHER PUBLICATIONS

Apostolaki-Iosifidou, Elpiniki, et al., "Measurement of power loss during electric vehicle charging and discharging", Energy, vol. 127, 2017, pp. 730-742.
Dimitrova, Zlatina, et al., "Techno-economic design of hybrid electric vehicles and possibilities of the multi-objective optimization structure", Applied Energy, vol. 161, 2016, pp. 746-759.
Gao, Zhiming, et al., "Battery capacity and recharging needs for electric buses in city transit service", Energy, vol. 122, 2017, pp. 588-600.
Krelling, Christian, et al., "Operational and financial performance of Delhi's natural gas-fueled public bus transit fleet: A critical evaluation", Transport Policy, vol. 47, 2016, pp. 178-188.
Lajunen, Antti, et al., "Lifecycle cost assessment and carbon dioxide emissions of diesel, natural gas, hybrid electric, fuel cell hybrid and electric transit buses", Energy, vol. 106, 2016, pp. 329-342.
Maréchal, François, et al., "Process integration: Selection of the optimal utility system.", Computers & Chemical Engineering, vol. 22, Supplement, 1998, pp. S149-S156.
Rogge, Matthias, et al., "Fast Charging Battery Buses for the Electrification of Urban Public Transport—A Feasibility Study Focusing on Charging Infrastructure and Energy Storage Requirements", Energies, vol. 8, 2015, pp. 4587-4606.
Sharma, Shivom, et al., "Robust Multi-Objective Optimization of Solid Oxide Fuel Cell-Gas Turbine Hybrid Cycle and Uncertainty Analysis", Journal of Electrochemical Energy Conversion and Storage, vol. 15, Nov. 2018, pp. 041007-1-041007-9.
Sharma, Shivom, et al., "Carbon Dioxide Capture From Internal Combustion Engine Exhaust Using Temperature Swing Adsorption", Frontiers in Energy Research, vol. 7, Article 143, Dec. 2019, 12 pages.
"Global EV Outlook 2019—Scaling-up the transition to electric mobility", International Energy Agency, May 2019, 232 pages.
"Report on CNG Cylinders for Automotive Vehicle Applications", Product Development, Ashok Leyland Ltd, 2012, 134 pages.

* cited by examiner

SYSTEM FOR $CO_2$ CAPTURE FROM INTERNAL COMBUSTION ENGINE

This application is the U.S. national phase of International Application No. PCT/EP2019/079442 filed Oct. 28, 2019 which designated the U.S. and claims priority to EP Patent Application No. 18203243.3 filed Oct. 30, 2018, the entire contents of each of which are hereby incorporated by reference.

FIELD OF THE INVENTION

This invention relates to a system for $CO_2$ capture from exhaust gas produced by an internal combustion engine.

BACKGROUND OF THE INVENTION

Among the challenges of the energy transition, reducing $CO_2$ emissions of the transportation sector is one of the most difficult. For post combustion $CO_2$ capture from power plants and process industries, known systems include technologies based on amine absorption, membrane separation, cryogenic separation and adsorption.

Amine absorption for capturing $CO_2$ is commonly used in power plant and process industry including natural gas sweetening (Sharma et al., 2017). The amine absorption process is energy intensive (5.87 MJ/kg-$CO_2$, 10% $CO_2$ in flue gas and 90% $CO_2$ capture), and the cost of $CO_2$ capture is 0.05 $/kWh (Desideri and Paolucci, 1999). For 90% $CO_2$ capture, performance of the amine absorption process and the membrane separation process are similar with about 10% loss in the plant efficiency (Wang et al., 2017). For natural gas power plants with 85% $CO_2$ capture using amine absorption, efficiency of the integrated plant decreases by over 8% due to the energy penalty of $CO_2$ capture (Tock and Marechal, 2014).

Pressure swing adsorption (PSA) is a well established gas separation technology which has found applications in air separation, hydrogen purification and natural gas industry. Further, temperature swing adsorption (TSA) is a known technology for $CO_2$ capture that requires low grade waste heat which may be available close to the $CO_2$ emission source.

Proll et al. (2016) evaluated a fluidized bed TSA system for $CO_2$ capture from flue gas stream, and in terms of heat transfer, fluidized bed reactor was found better than fixed and moving bed reactors. Gibson et al. (2016) have evaluated several adsorption materials and process designs for $CO_2$ capture from gas fired power plant. Ntiamoah et al. (2015) performed cyclic experiments on single adsorption column, and product (hot) $CO_2$ was used to supply the heat of desorption in the regeneration step. Marx et al. (2016) studied cyclic behaviour and separation performance of TSA for post-combustion $CO_2$ capture.

In the year 2014, $CO_2$ emissions due to human activities accounted for about 65 percent of greenhouse gas emissions globally (IPCC report). In 2016, transportation sector was accountable for about 28 percent of $CO_2$ emissions in USA (EPA report). In 2015, according to the European Environment Agency, road transportation sector contributed about 0.746 giga tonnes $CO_2$ emissions. In 2016, according to European Automobile Manufacturers Association, 2.7 million commercial vehicles were produced in the European Union. Ligterink (2015) has reported 2.65 kg of $CO_2$ emission per liter diesel consumption by heavy duty vehicles.

The above numbers show a huge potential for on board $CO_2$ capture technology for vehicles which would reduce $CO_2$ emissions significantly. There has however been limited research on $CO_2$ capture from vehicles due to mobile nature of source, relatively smaller production rate, discontinuous emissions, and difficulties of on board $CO_2$ storage. For instance, the Amine absorption process is difficult in mobile applications, although it has been proposed in marine applications (Luo and Wang, 2017).

FIG. 1 shows typical composition of exhaust gas from a diesel engine. $CO_2$ and pollutant emissions are about 12% and 1% (CO, HC, $NO_x$, $SO_2$, PM) respectively (Khair and Majewski, 2006). Diesel engines typically have an efficiency of about 35%, whereby the remaining energy is lost in the cooling system (about 25%) and in exhaust heat (about 40%) (Hossain and Bari, 2014).

The temperature of engine exhaust gas normally ranges from 350 to 700° C. (Kanchibhotla and Bari, 2018; Dimitrova and Marechal, 2017). The heat of the cooling system can also be recovered at around 95° C. (Abdelghaffar et al., 2002). The waste heat from engine exhaust and cooling system has been used in a Rankine cycle to generate mechanical power for heavy duty trucks (Grelet et al., 2016) and cruise ships (Luo and Wang, 2017). Sprouse and Christopher (2013) have reviewed many studies on the use of organic Rankine cycle for the waste heat recovery from the exhaust of internal combustion engine, and claimed 10% improvement in the fuel economy.

SUMMARY OF THE INVENTION

An object of the present invention to provide a system for $CO_2$ capture from exhaust gas produced by an internal combustion engine adapted for mobile applications.

It is advantageous to provide a system for $CO_2$ capture from exhaust gas produced by an internal combustion engine that is efficient and economical.

It is advantageous to provide a system for $CO_2$ capture from exhaust gas produced by an internal combustion engine that is compact.

Objects of this invention have been achieved by providing the system according to claim 1.

The invention advantageously combines an organic Rankine cycle (ORC) with temperature swing adsorption (TSA) to capture the $CO_2$ from a combustion engine exhaust stream, utilizing the waste heat of the combustion engine.

In an embodiment, Amine doped metal-organic frameworks (MOFs) adsorbents are selected for $CO_2$ capture, as they show good performance in the presence of water (Huck et al., 2014).

According to embodiments of the invention, adsorbent materials may include metal organic frameworks (Mg, Zn, Al or Fe MOF), zeolitic imidazolate frameworks (ZIF-8, ZIF-69), amine functionalized porous polymer networks (PPN-6-CH2-DETA, PPN-6-CH2-TETA), amine infused silica (PEI-silica), amine loaded MCM-41 (PEI-MCM-41), mmen-M2(dobpdc) framework, zeolites (Zeolite-5 A).

Part of the mechanical power produced by the ORC may advantageously be used to generate cold utility using $CO_2$-based heat pump, for instance by using a turbo-compressor driven by the exhaust gas stream. This cold utility may be used to remove heat of adsorption and condense the water from engine exhaust stream.

Part of the mechanical power generated by the ORC may be used to compress and liquefy the produced $CO_2$, for instance by using a turbo-compressor driven by the exhaust gas stream.

The $CO_2$ capture system advantageously does not require any external power and thus has energy self sufficiency. In other words, TSA with turbo-compressors according to embodiments of the invention is an attractive choice for $CO_2$ capture from vehicles without any energy penalty. The $CO_2$ capture system for truck exhaust stream according to embodiments of the invention may advantageously capture up to 90% of the emitted $CO_2$ (i.e., 2.11 kg $CO_2$ per liter of diesel consumption). In addition, the captured $CO_2$ can advantageously be utilized as a carbon source for producing new fuel (methane or liquid fuels) by integrating hydrogen produced from renewable energy resources.

Disclosed herein is a system for $CO_2$ capture from a combustion engine comprising an exhaust gas flow circuit having an inlet end fluidly connected to an exhaust of the combustion engine, a heat exchanger circuit, a primary exhaust gas heat exchanger for transferring heat from exhaust gas to fluid in the heat exchanger circuit, at least one compressor for compressing fluid in a section of the heat exchanger circuit, the compressor driven by thermal expansion of heat exchanger circuit fluid from the primary exhaust gas heat exchanger, and a $CO_2$ temperature swing adsorption (TSA) reactor fluidly connected to an outlet end of the exhaust gas flow circuit. The TSA reactor includes at least an adsorption reactor unit and a desorption reactor unit, the heat exchanger circuit comprising a heating section for heating the desorption unit and a cooling section for cooling the adsorption unit.

In an advantageous embodiment, the fluid in the heat exchanger circuit is, or contains primarily, $CO_2$.

In an advantageous embodiment, the system further comprises at least a second compressor driven by thermal expansion of heat exchanger circuit fluid from the primary exhaust gas heat exchanger (H1), the second compressor fluidly connected to an outlet of the desorption reactor unit (D2) for compressing $CO_2$ output by the desorption unit.

In an embodiment, the heat exchanger circuit is fluidly connected to a $CO_2$ output flow circuit of the TSA reactor and the heat exchanger circuit contains $CO_2$ outputted from the TSA reactor.

In an embodiment, fluid in the heat exchanger circuit is independent of a $CO_2$ output flow circuit of the TSA reactor.

In an advantageous embodiment, the compressors are turbocompressors.

In an advantageous embodiment, the TSA reactor further comprises a preheating unit and a precooling unit, a heating section of the heat exchanger circuit passing through the preheating unit and the desorption unit to heat these units to cause the adsorbed $CO_2$ to be extracted from the adsorbent, and a cooling section of the heat exchanger circuit passes through the precooling unit and the adsorption unit D4 to cool these units below the temperature at which the adsorbent adsorbs the $CO_2$ in the exhaust gas stream.

In an advantageous embodiment, the exhaust gas flow circuit comprises a gas-liquid separator upstream of the TSA reactor to extract water from the exhaust gas stream.

In an advantageous embodiment, a cooling section of the heat exchanger circuit comprises an expansion valve to lower the temperature and pressure of the heat exchanger circuit gas outputted from a preheating unit of the TSA reactor.

In an advantageous embodiment, the system comprises a $CO_2$ storage tank for collection and storage of outputted $CO_2$.

In an advantageous embodiment, the outputted $CO_2$ is compressed at its storage pressure by one of said compressors.

In an advantageous embodiment, the outputted $CO_2$ is compressed by constant volume heating operation of the desorption reactor unit.

In an advantageous embodiment, the TSA reactor comprises an amine doped MOFs adsorbent.

In an advantageous embodiment, the TSA comprises adsorbent material on the surface of a fixed bed in each of said reactor units.

In an advantageous embodiment, the reactor units are interconnected by fluid flow circuits and valves that may be operated to successively cycle the reactor units through different states from adsorption, preheating, desorption and precooling.

Further objects and advantageous aspects of the invention will be apparent from the claims, and from the following detailed description and accompanying figures.

BRIEF DESCRIPTION OF THE DRAWINGS

The invention will now be described with reference to the accompanying drawings, which by way of example illustrate embodiments of the present invention and in which.

DETAILED DESCRIPTION OF EMBODIMENTS OF THE INVENTION

Figure 2:
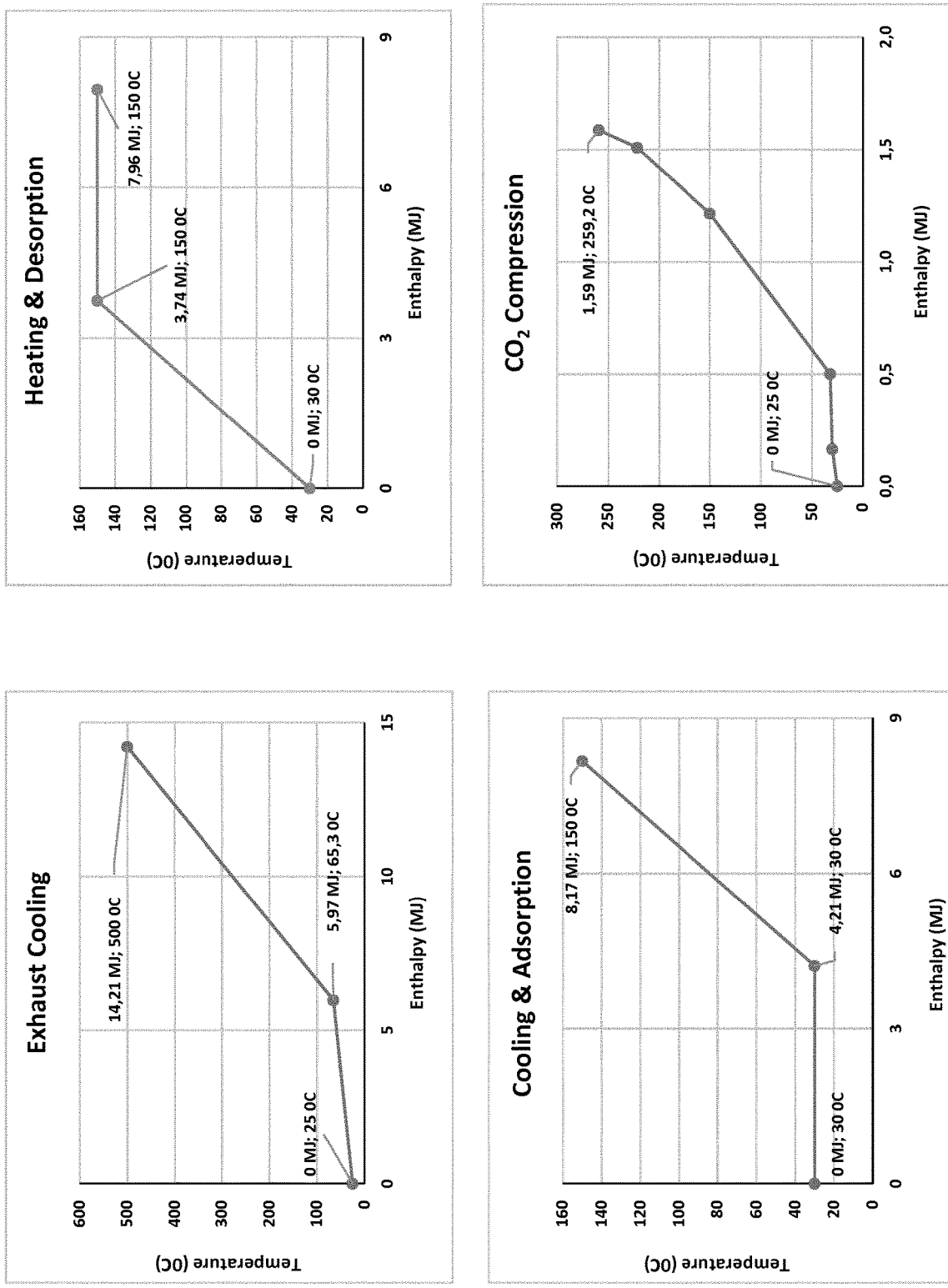
FIG. 2 are graphs illustrating Enthalpy-temperature profiles for exhaust cooling, adsorption cooling, desorption heating and $CO_2$ compression for 1 liter of diesel.
Figure 3:
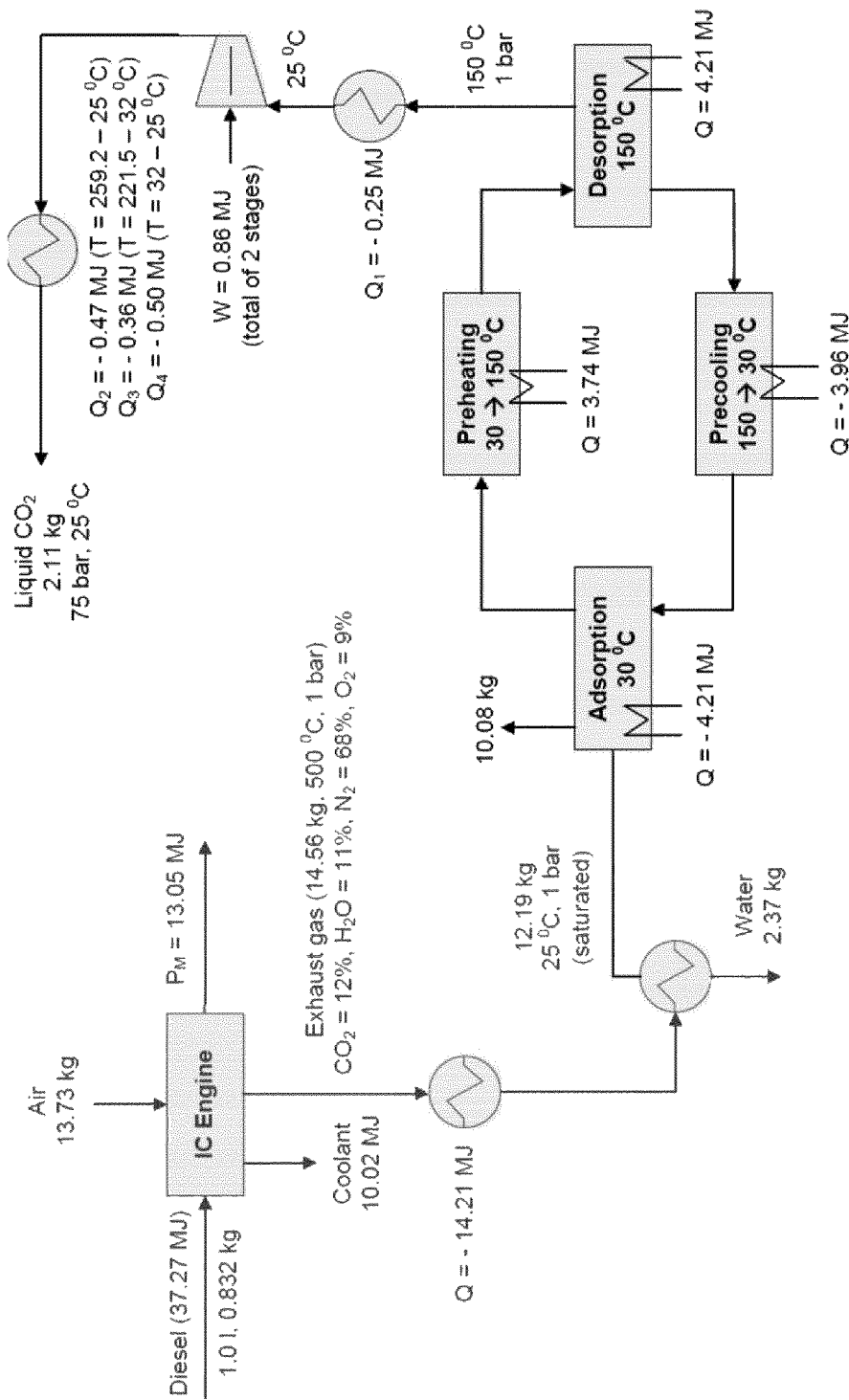
FIG. 3 is a schematic block flow diagram of an example of simple heat and mass flows for $CO_2$ capture from a diesel engine exhaust according to an embodiment of the invention.

Energy Analysis of a $CO_2$ Capture System According to Embodiments of the Invention FIG. 3 illustrates an integrated $CO_2$ capture system, based on 1 liter diesel consumption in an internal combustion engine. First of all, diesel engine exhaust based on 1 liter of diesel consumption is analyzed for $CO_2$ capture. The TSA system is calculated using PPN-6-$CH_2$TETA as an adsorbent (Huck et al., 2014). FIG. 2 shows enthalpy-temperature profiles for exhaust cooling, adsorption cooling, desorption heating and product $CO_2$ compression. The exhaust stream contains 14.21 MJ/l-diesel waste heat, heating and desorption step requires 7.96 MJ/l-diesel heat, 8.17 MJ/l-diesel heat has to be removed during cooling and adsorption step, and 1.58 MJ/l-diesel heat has to be removed for $CO_2$ compression and liquefaction.

FIG. 3 shows simple heat and mass flows for $CO_2$ capture system, based on 1 liter diesel consumption. 1 liter diesel contains 37.27 MJ energy, which is divided into three parts by the internal combustion engine: 13.05 MJ as mechanical power to drive the vehicle, 14.21 MJ as waste heat in exhaust gas, and 10.02 MJ as heat removed using coolant. The exhaust gas stream is cooled down to 25° C., and water is condensed and removed. The cooled exhaust stream (saturated with water at 25° C.) goes to the adsorption bed, where $CO_2$ is attached to the adsorbent. Finally, $CO_2$ is desorbed from the adsorbent at high temperature, and then compressed and liquefied.

TABLE 1

Energy and exergy analysis of the internal combustion engine, the $CO_2$ capture system, and compression power required for $CO_2$ liquefaction (1 liter diesel)

| Internal Combustion Engine | Diesel (fuel) | Mechanical Power | Exhaust | Cooling System |
|---|---|---|---|---|
| Energy, MJ | 37.27 | 13.05 | 14.21 | 10.02 |
| Exergy, MJ | 38.53 | 13.05 | 3.99 | 2.42 |

| $CO_2$ Capture System | Exhaust | Heating & Desorption | Cooling & Adsorption | CO2* |
|---|---|---|---|---|
| Energy, MJ | 14.21 | 7.96 | 8.17 | 1.59 |
| Exergy, MJ | 3.99 | −1.88 | 0.74 | 0.27 |
| Net Exergy Available: ε, MJ | | 3.12 | | |
| Mechanical Power (=0.5ε), MJ | | 1.56 | | |
| Mechanical Power for $CO_2$ Compression (75 bar) and Liquefaction, MJ | | 0.86 | | |
| Mechanical Power for $CO_2$ Compression (200 bar), MJ | | 1.15 | | |

Figure 1:
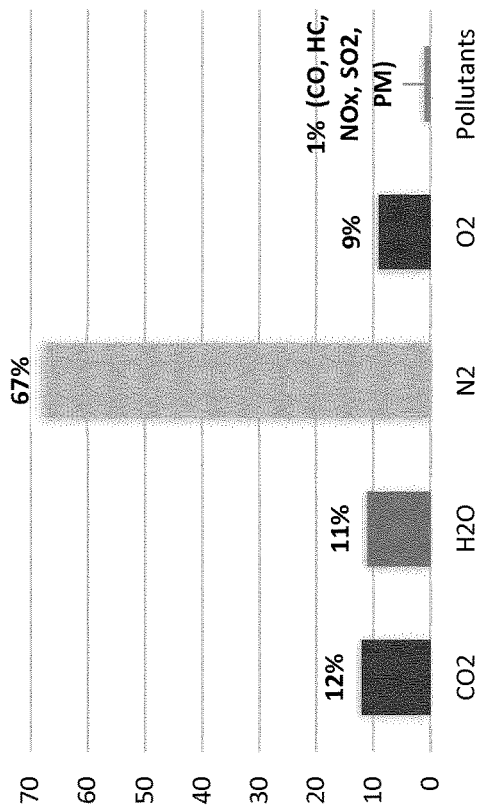
FIG. 1 is a graph illustrating the composition of exhaust gas from a diesel engine.
Figure 4:
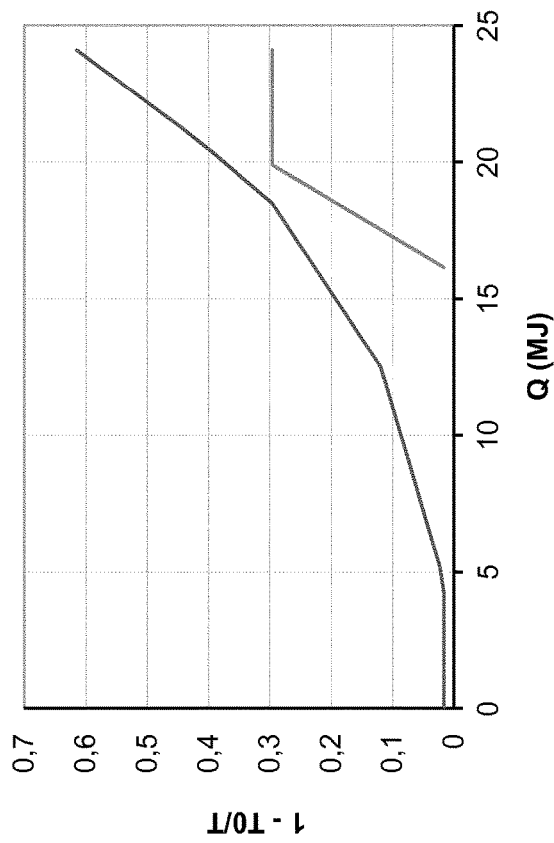
FIG. 4 is a graph illustrating Q vs. 1-T0/T of a $CO_2$ capture system for 1 liter diesel.

Table 1 also presents exergetic analysis of internal combustion engine (Al-Najem and Diab, 1992; Kul and Kahraman, 2016). The $CO_2$ capture system according to embodiments of the invention is thus feasible from the exergetic point of view (Table 1 and FIG. 4). In total, 3.12 MJ of net exergy is available. Assuming a 50% efficiency, therefore there is a potential to produce the equivalent of 1.56 MJ of mechanical power for the $CO_2$ capture and storage system. Assuming an isentropic efficiency of 75% for the compressors, this value can be compared with the compression power needed to produce $CO_2$ in the liquid form (compression at 75 bar): 0.86 MJ or compressed $CO_2$ at 200 bar: 1.15 MJ. For 1 liter diesel consumption in an internal combustion engine, 2.11 kg $CO_2$ is captured by the system, which has a volume of 2.96 liters (as liquid $CO_2$ product) or 4.53 liters (as compressed $CO_2$ product).

Design of a $CO_2$ Capture System According to Embodiments of the Invention

The above analysis shows that it is possible to generate the heat and the work that is needed to capture the $CO_2$ of exhaust gases of a combustion engine using energy available in the exhaust gases, which is particularly advantageous for mobile applications, such as for $CO_2$ capture from the exhaust of a diesel engine on a truck, bus or boat.

The $CO_2$ capture system according to embodiments of the invention combines heat pumping, cooling and Rankine cycle integration. It is advantageous to produce a cooling capacity at a temperature lower than the 40° C. for the adsorption step of a temperature swing adsorption (TSA) process, especially in mobile applications where environmental temperature may exceed the optimal temperature for efficient adsorption of $CO_2$.

Referring to the figures, in particular FIGS. 5 to 10 and 12 to 13b, a $CO_2$ capture system 2 for capturing $CO_2$ from the exhaust of an internal combustion (IC) engine 1, according to embodiments of the invention, comprises an exhaust gas flow circuit 6, a temperature swing adsorption reactor 4, a heat exchanger circuit 12, a $CO_2$ output flow circuit 8, and one or more turbines or compressors 10, which may advantageously be in the form of turbocompressors TC1, TC2.

Turbocompressors may be mechanically connected together via a common shaft or a fixed or variable transmission mechanism. The turbocompressors TC1, TC2 may also be connected to electrical generators. In a variant, turbocompressors TC1, TC2 may be not be mechanically coupled together, but only electrically coupled, for instance the electrical energy from a generator coupled to a turbocompressor being used to drive a motor coupled to another turbocompressor.

The exhaust gas flow circuit 6 is connected at an inlet end to the exhaust of the IC engine 1 and at an outlet end to the TSA, and passes through a primary exhaust gas heat exchanger H1 to transfer waste heat from the exhaust gas to a heating section 12b of heat exchanger circuit.

The heating section 12b contains gas, and may be fluidly connected to said one or more turbocompressors. Expansion of the gas in the heating section 12b due to the heat transfer in the primary heat exchanger drives the one or more turbocompressors TC1, TC2. The gas contained in the heat exchanger circuit may in advantageous embodiments be $CO_2$.

Figure 7:
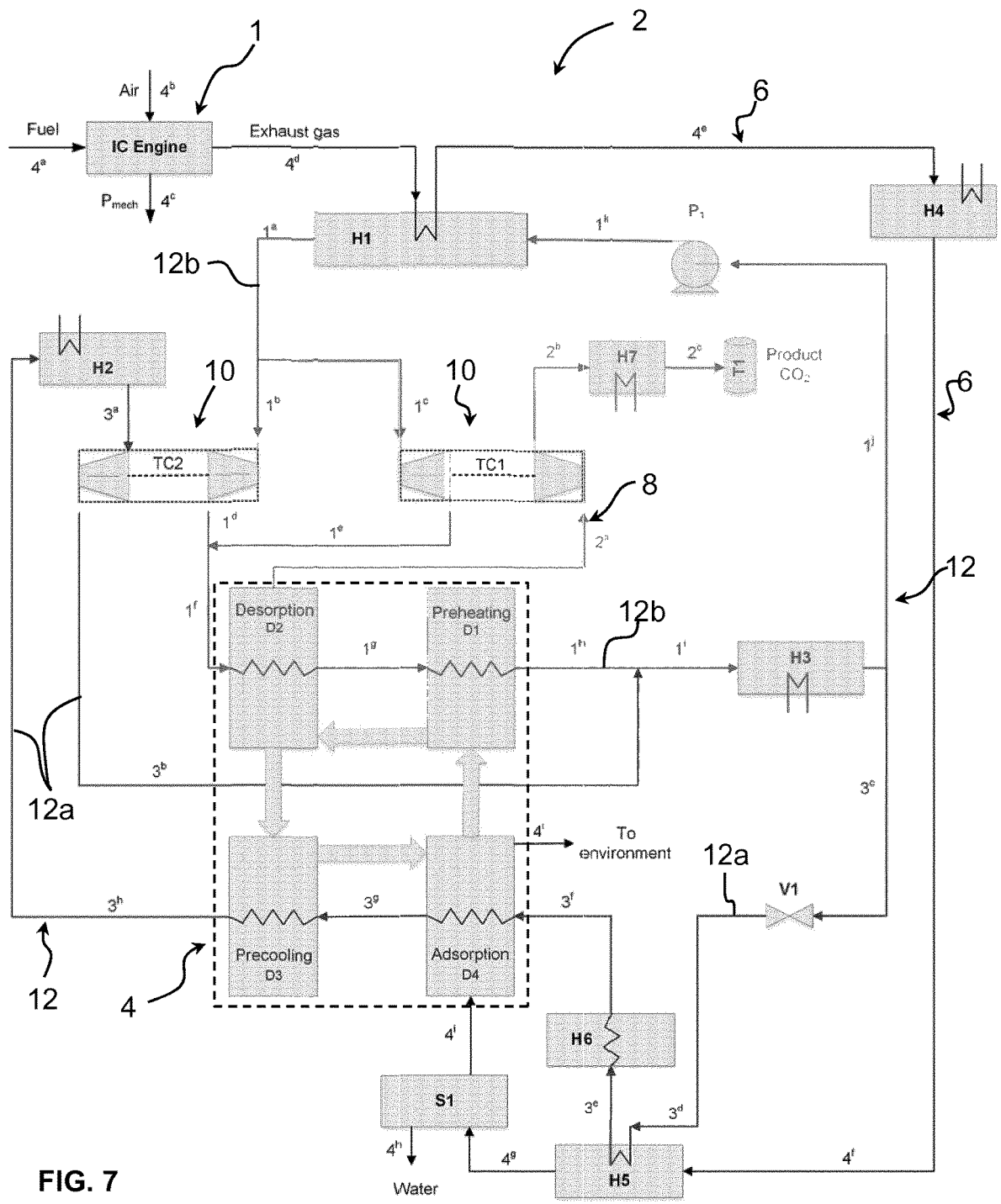
FIG. 7 is a schematic block flow diagram of a $CO_2$ capture system from a combustion engine exhaust according to a third embodiment of the invention.
Figure 8:
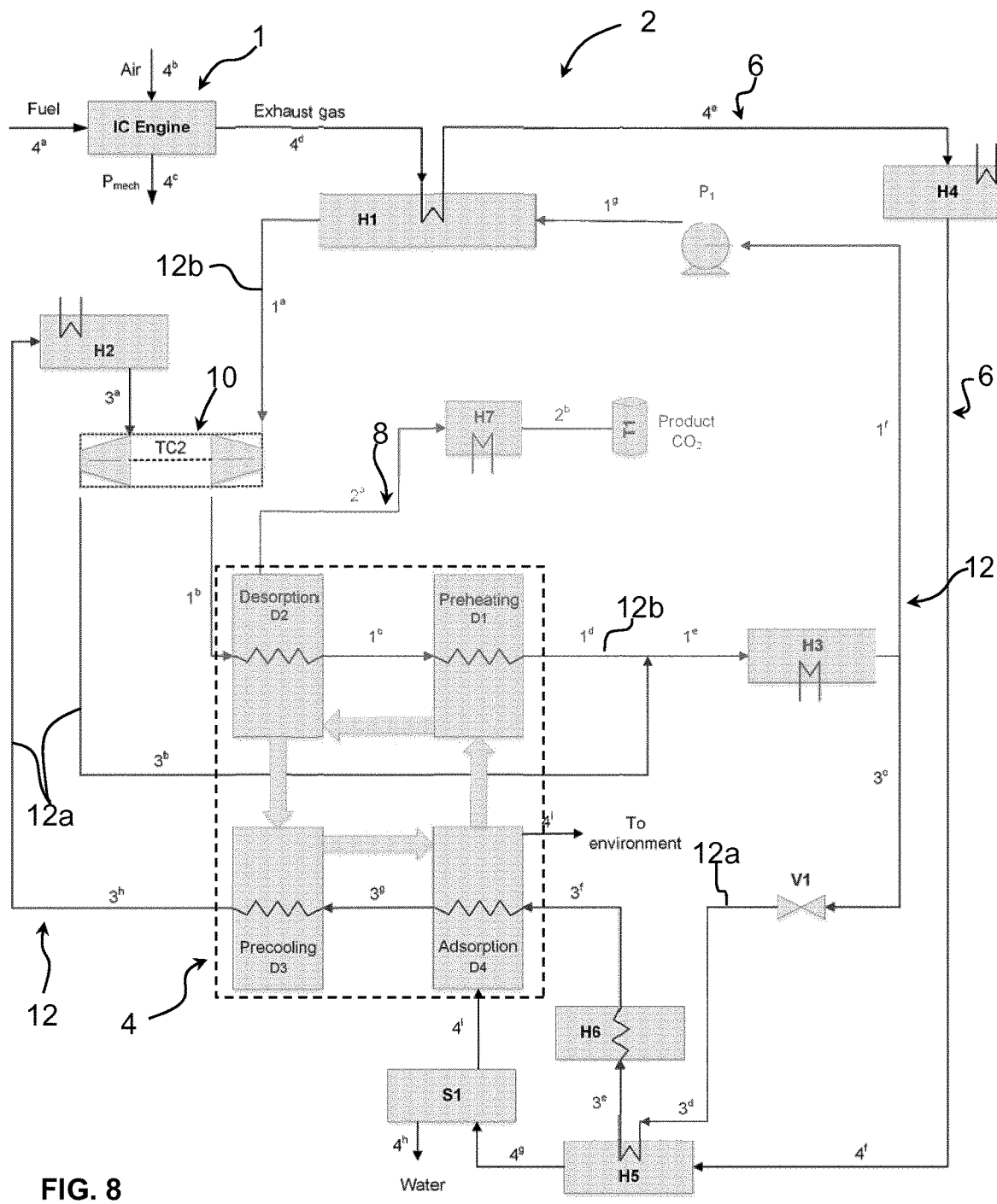
FIG. 8 is a schematic block flow diagram of a $CO_2$ capture system from a combustion engine exhaust according to a fourth embodiment of the invention.

In certain embodiments for instance as illustrated in FIGS. 7 and 8, the fluid in the heat exchanger circuit is independent of the TSA reactor $CO_2$ output flow circuit 8.

In certain other embodiments as illustrated in FIGS. 5, 6, 9 and 10, the heat exchanger circuit 12 is fluidly connected to the TSA reactor $CO_2$ output flow circuit 8, and the heat exchanger circuit 12 contains $CO_2$ outputted from the TSA reactor 4.

The TSA reactor comprises an adsorption unit D4, a preheating unit D1, a desorption unit D2, and a precooling unit D3. The heating section 12b of the heat exchanger circuit passes through the preheating unit D1 and the desorption unit D2 to heat these units to cause the adsorbed $CO_2$ to be extracted from the adsorbent. The cooling section 12a of the heat exchanger circuit passes through the precooling unit D3 and the adsorption unit D4 to cool these units below the temperature at which the adsorbent adsorbs the $CO_2$ in the exhaust gas stream. In certain embodiments, the temperature of the adsorption unit D4 for adsorption is preferably around 40° C. or less.

The cooling section 12a of the heat exchanger circuit 12 may comprise an expansion valve V1 to lower the temperature and pressure of the heat exchanger circuit gas outputted from the preheating unit D1 of the TSA reactor 4, for recirculation in the adsorption unit D4 and in certain embodiments where the heat exchanger circuit is connected to the $CO_2$ output flow circuit 8, for collection and storage of outputted $CO_2$ in a $CO_2$ storage tank T1.

The exhaust gas flow circuit 6 further comprises a gas-liquid separator S1 to extract water from the exhaust gas stream. Preferably, the gas-liquid separator S1 is positioned upstream of the TSA reactor 4, and comprises a condenser for condensing water in the exhaust gas stream before the exhaust gas stream enters the adsorption unit D4. The condensed water may be fed into a water storage tank (not shown), or allowed to flow into the environment.

Further heat exchangers for the exhaust gas stream, in particular an additional exhaust gas heat exchanger H4 in the exhaust gas stream after the primary exhaust gas heat exchanger H1 may be provided to further cool down the exhaust gas stream prior to entry in the TSA reactor 4.

The heat exchanger circuit comprises a heat exchanger H2 between the outlet of the precooling unit D3 of the TSA reactor and the compressor 10, for instance in the form of a heat exchanger H2, prior to compression of the heat exchanger circuit gas by the compressor 10. The heat exchanger H2 after the outlet of the precooling unit D3 of the TSA reactor allows to cool down the heat exchanger circuit gas that is heated in the TSA, prior to recirculation in the cooling section 12a.

The heat exchanger circuit comprises a heat exchanger H3 at the outlet of the preheating unit D1 of the TSA reactor, for instance in the form of condenser H3, to cool down the heat exchanger circuit gas exiting the hot section of the TSA, prior to recirculation in the cooling section 12a.

Exhaust gas stream after cooling down via heat exchangers H1, H4 to a temperature adapted for adsorption by the adsorbent of the TSA reactor, flows into the adsorption unit D4 of the TSA reactor. A large percentage of the $CO_2$ in the exhaust gas stream, for instance around 90% of the $CO_2$, is adsorbed by the adsorbent in the adsorption unit D4 and the remaining gases may be output into the environment.

In an advantageous embodiment (illustrated in FIG. 13b), the adsorbent material is on the surface of a fixed bed in each of a plurality of reactor chambers D1-D4 that are interconnected by a gas flow circuits and valves that may be operated to rotate the function of each of the reactor chambers successively from adsorption, to preheating, to desorption, to precooling. Thus each reactor chamber is at a different successive temperature state and each reactor chamber acts in successive rotation as the adsorption unit D4, preheating unit D1, desorption unit D2, and precooling unit D3.

In a variant, the adsorbent material is on particles forming a fluidized bed that flows from one reactor chamber D1-D4 to the next (embodiment illustrated in FIG. 13b), the reactor chambers interconnected by fluidized bed flow circuits and valves that may be operated to control flow of the fluidized bed between each of the reactor chambers successively from adsorption, to preheating, to desorption, to precooling. Thus each reactor chamber is at a different successive temperature state and acts as one of the adsorption unit D4, preheating unit D1, desorption unit D2, or precooling unit D3.

The TSA reactor comprises at least two reactors to function successively as adsorption and desorption reactors, whereby the precooling and preheating units may be omitted or integrated within the respective adsorption and desorption reactors.

Preferably, the TSA reactor comprises at least four reactor units such that at least two reactor units during a cycle act as precooling, respectively preheating reactors to improve the efficiency and yield of adsorption and desorption of $CO_2$. In variants, more than four reactors may however be provided to have additional precooling and preheating reactor units. In variants however, the TSA reactor may comprise three reactor units, for instance an adsorption unit, a preheating & desorption unit, and a cooling unit, whereby the preheating and desorption can be incorporated in a single reactor unit.

Figure 5:
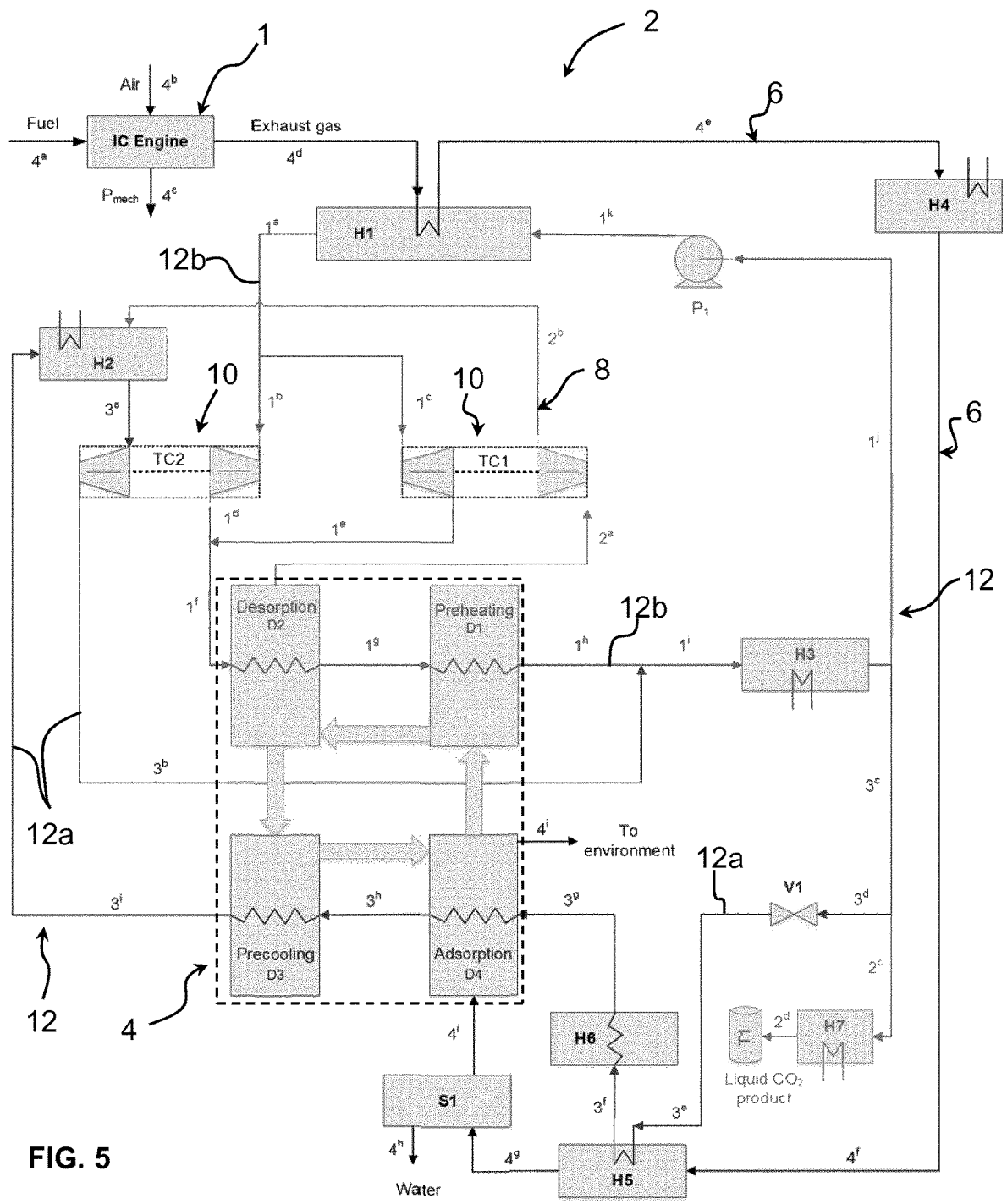
FIG. 5 is a schematic block flow diagram of a $CO_2$ capture system from a combustion engine exhaust according to a first embodiment of the invention.

Referring now to the particular embodiments illustrated in FIGS. 5 to 10, starting with the embodiment of FIG. 5. This embodiment presents a system that combines a temperature swing adsorption reactor 4 to capture the $CO_2$ from the exhaust stream of an internal combustion or Stirling engine 1 with a turbo-compressor 10 to produce liquid $CO_2$.

The atmospheric temperature swing adsorption system 4 comprises at least two stages: (D2) desorption of CO2 from the adsorbent, and (D4) adsorption of CO2 from the exhaust gases.

In a preferred embodiment, the atmospheric temperature swing adsorption system 4 comprises four stages: (D1) adsorbent preheating, (D2) desorption of $CO_2$ from the adsorbent, (D3) adsorbent precooling, and (D4) adsorption of $CO_2$ from the exhaust gases.

In a variant, the atmospheric temperature swing adsorption system 4 comprises three stages: (D2) desorption of $CO_2$ from the adsorbent (including adsorbent preheating), (D3) adsorbent precooling, and (D4) adsorption of $CO_2$ from the exhaust gases.

A primary exhaust gas heat exchanger H1 recovers the heat of the exhaust gases to heat $CO_2$ fluid in the heat exchanger circuit 12, which is pumped by a pump P1 as a liquid at supercritical pressure, and heated up to supercritical conditions.

The supercritical heat exchange fluid may be divided into two flows that are fed into two turbocompressors 10. The first turbocompressor TC1 is used to compress the $CO_2$ extracted from the adsorbent to the $CO_2$ storage pressure. Excess of work of the first turbocompressor TC1 may be supplied to drive a generator (not shown).

The second turbocompressor TC2 may be used to compress the $CO_2$ evaporated in the heat exchangers H5, H6, D4, D3 and H2. Excess work of the second turbocompressor TC2 may be supplied to drive a generator (not shown).

One or two heat exchangers, that uses the outlet streams of the turbines of the turbocompressors, are used to supply heat of desorption of the captured $CO_2$ (D2) and later preheating of the adsorbent (D1).

A heat exchanger H3 acts as a condenser to condense the compressed $CO_2$ by heat exchange with the environment.

The gas liquid separator S1 separates the condensed water from the combustion gases.

The expansion valve V1 expands the liquid $CO_2$ to a lower pressure, which has suitable temperature for the adsorption unit.

A heat exchanger acting as an evaporator H5 produces cold that is used to cool down the combustion gases to a low temperature. The cold combustion gases are fed to the adsorbent unit D4.

An additional evaporator H6 may be provided to generate additional cooling for various auxiliary purposes, such as vehicle cabin cooling.

One or two heat exchangers cool the adsorbent bed (D4) followed by the precooling of the adsorbent bed (D3) which leaves the desorption step (D2).

The storage tank T1 stores the captured $CO_2$ in the liquid form at the outlet of condenser H3. High pressure compressed $CO_2$ gas storage can be used as an alternative for liquid $CO_2$ storage.

Figure 6:
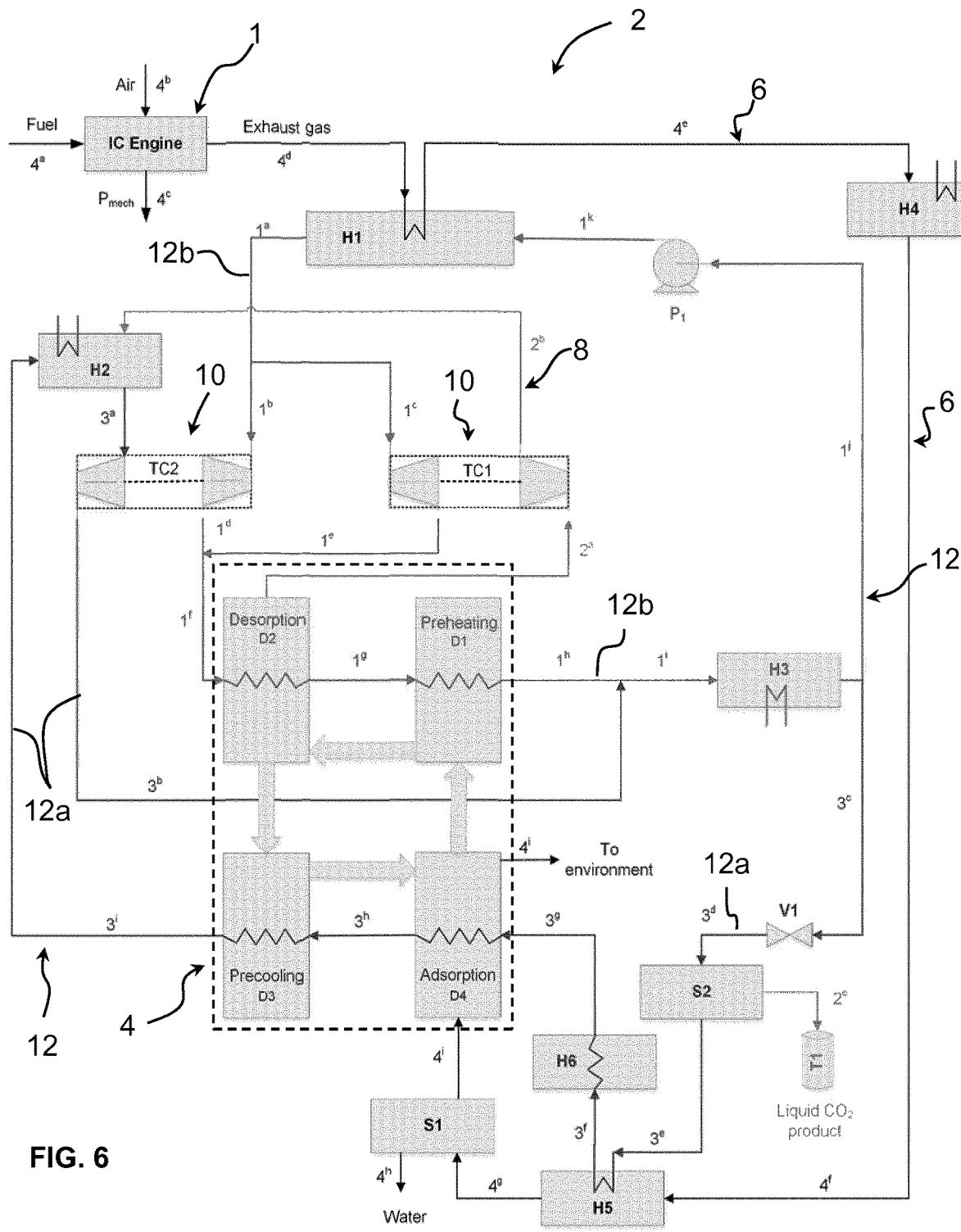
FIG. 6 is a schematic block flow diagram of a $CO_2$ capture system from a combustion engine exhaust according to a second embodiment of the invention.

In a variant, as illustrated in FIG. 6, a gas liquid separator S2 in the heat exchanger circuit at the outlet of valve V1 may be provided to produce liquid $CO_2$ product.

In a variant, as illustrated in FIG. 7, the system comprises a separate flow circuit for recovering $CO_2$ from the adsorbent using a heat exchanger coupled to ambient (environmental) temperature and fed into a liquid storage tank T2.

In a variant, as illustrated in FIG. 8, $CO_2$ compression can also be realised by constant volume heating operation of the desorption reactor unit D2 instead of using the turbocompressor TC1.

Figure 9:
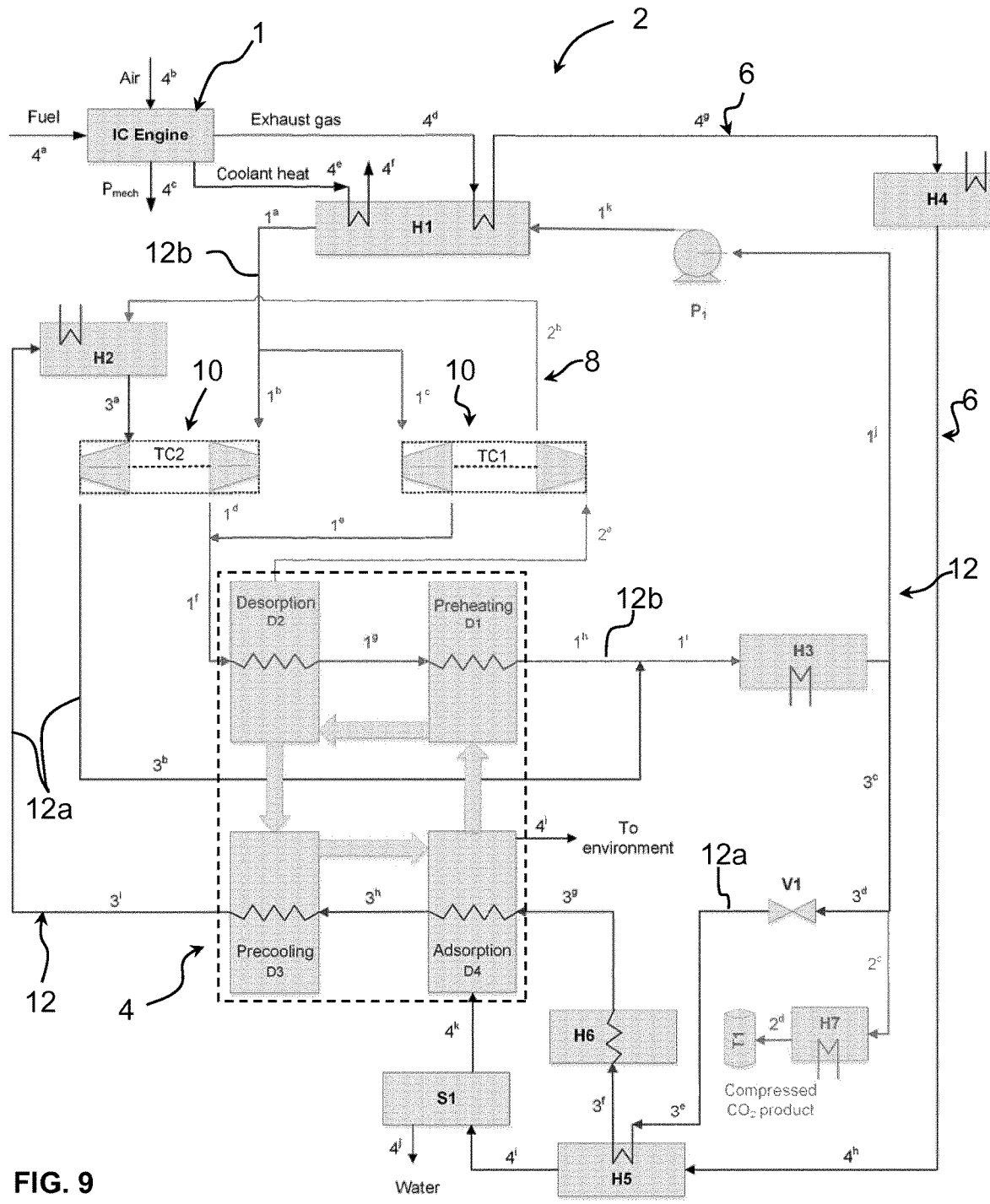
FIG. 9 is a schematic block flow diagram of a $CO_2$ capture system from a combustion engine exhaust according to a fifth embodiment of the invention.

In an embodiment, as illustrated in FIG. 9, waste heat available from the engine cooling system can be used as an additional source of heat for the system.

Figure 10:
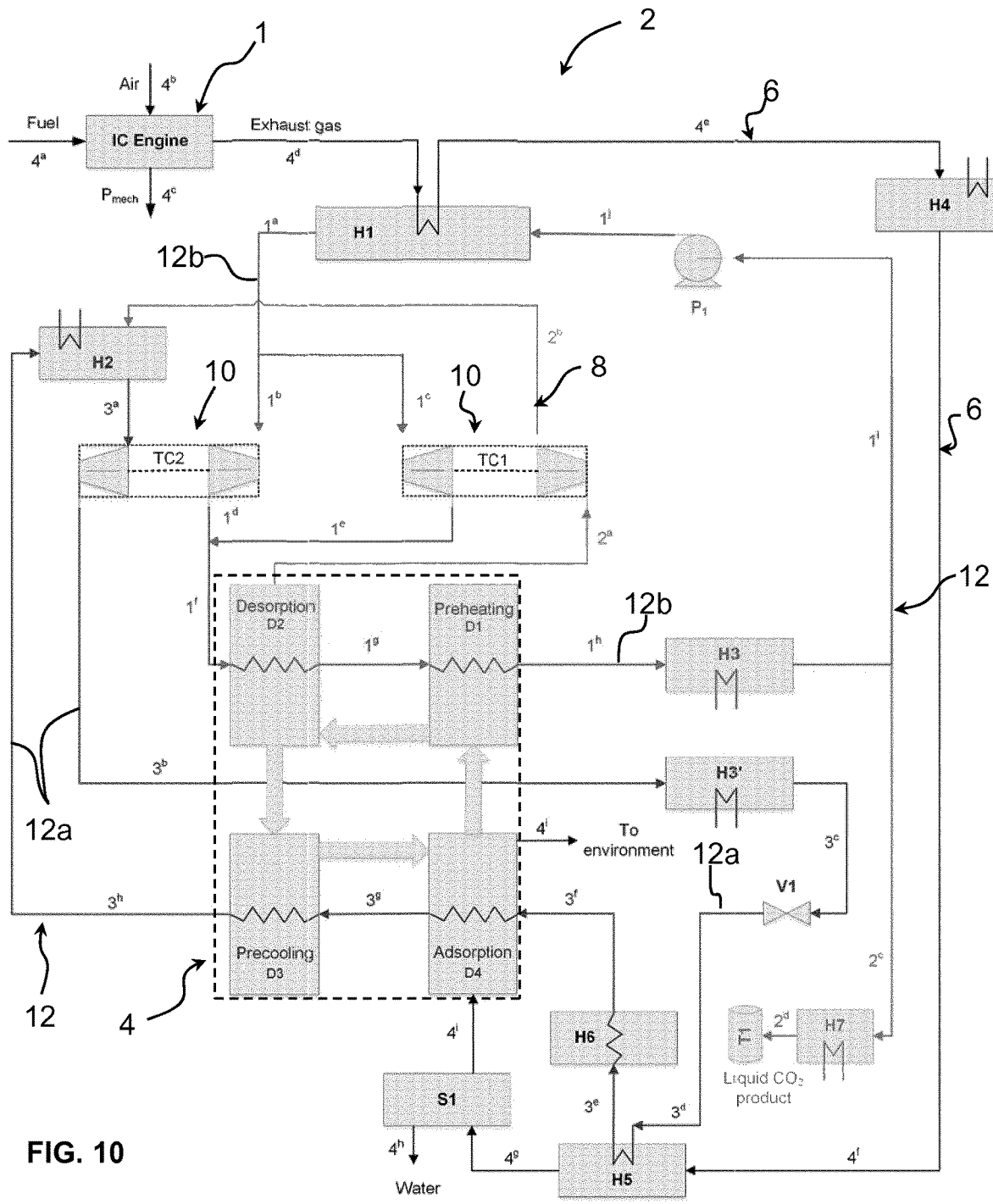
FIG. 10 is a schematic block flow diagram of a $CO_2$ capture system from a combustion engine exhaust according to a sixth embodiment of the invention.

In a variant, as illustrated in FIG. 10, heat exchanger circuits 12a and 12b have different fluids.

Example of the Performance of a $CO_2$ Capture System According to an Embodiment of the Invention The $CO_2$ capture system is designed for 1 day operation of heavy duty truck for delivery in a city, which travels 250 km in 8 hours (20 liters diesel/100 km, Delgado et al., 2017). The diesel engine emits 117.2 kg of $CO_2$ by consuming 50 liters diesel, and 105.5 kg of $CO_2$ (90% capture) should be captured and stored by the $CO_2$ capture system. The working capacity (or $CO_2$ loading) of the adsorbent material is 0.1 kg-$CO_2$/kg-adsorbent (Verdegaal et al., 2016). Finally, 1 h adsorption-desorption cycle time has been assumed (Gibson et al., 2016).

adsorption temperature to desorption temperature. Finally, a compressor is used to compress the product $CO_2$ after the desorption step. The mechanical power generated using turbine is sufficient to run compressor for $CO_2$ based heat pump and compressor for product $CO_2$.

Figure 11:
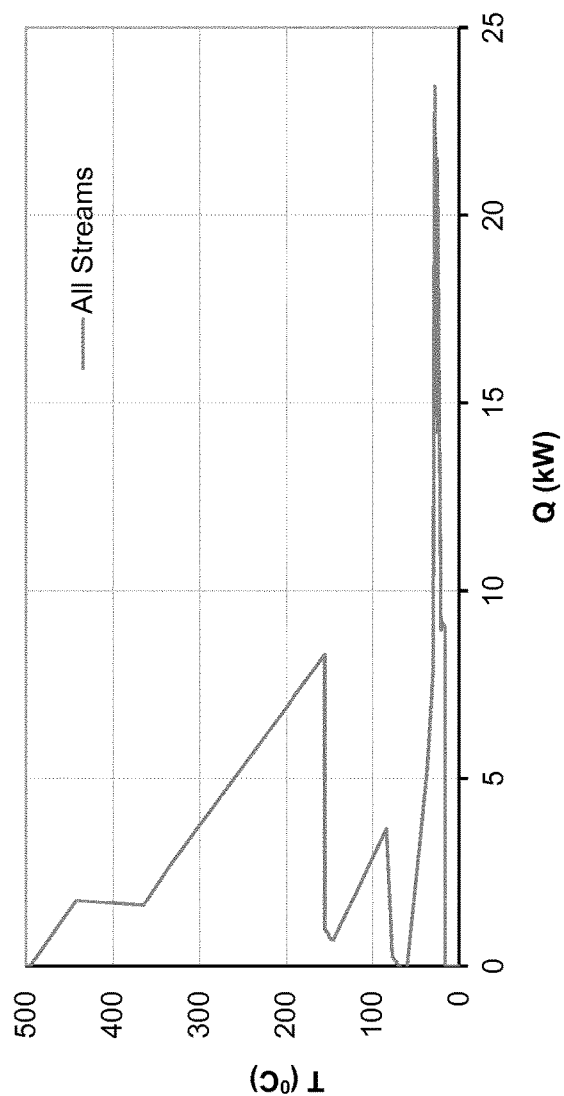
FIG. 11 are graphs illustrating composite and grand composite curves for a $CO_2$ capture system according to embodiments of the invention.
Figure 11:
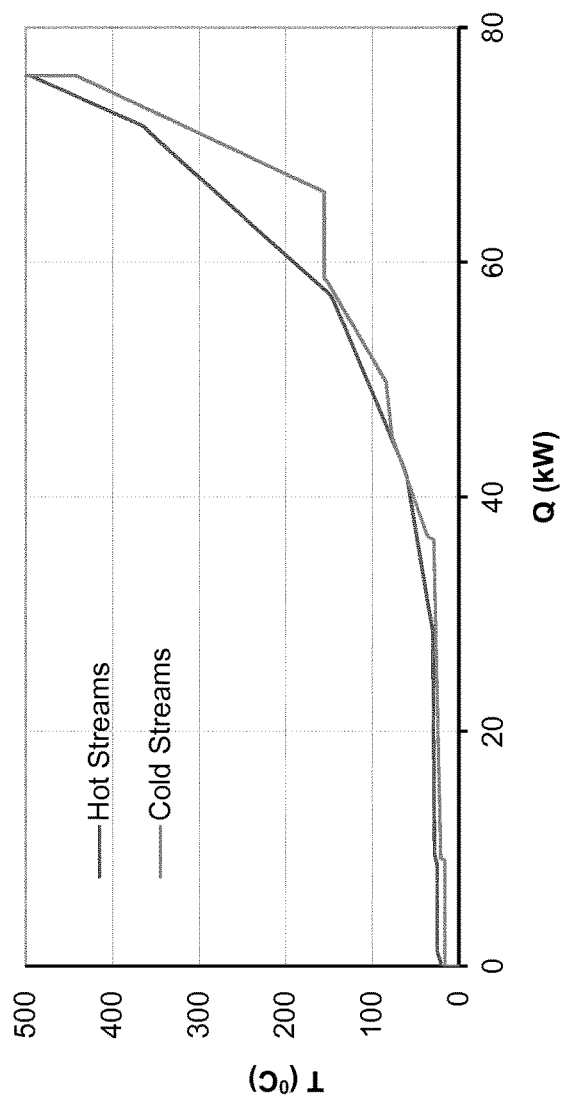
Figure 12:
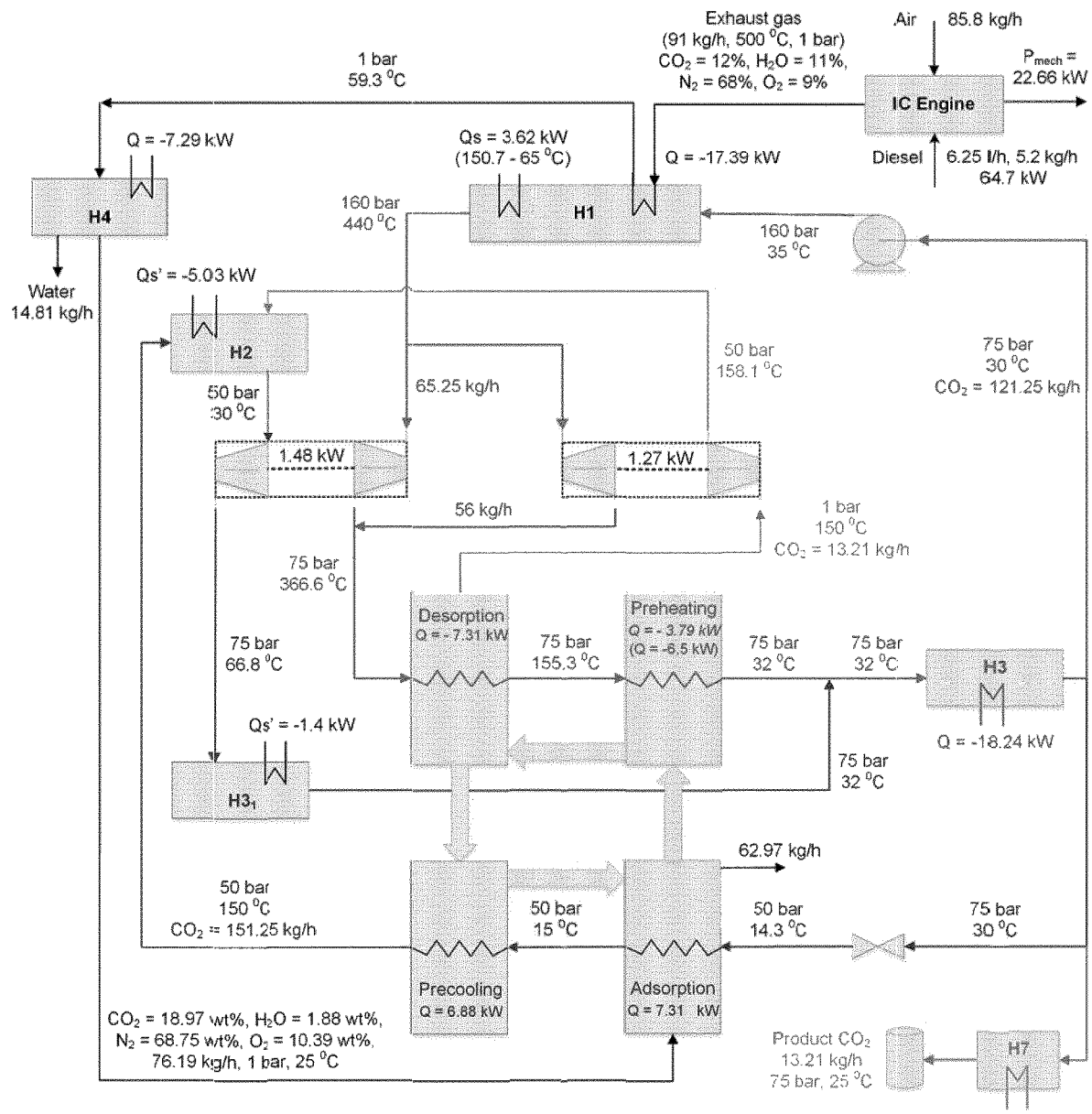
FIG. 12 is a schematic block flow diagram of a $CO_2$ capture system from a combustion engine exhaust according to an embodiment of the invention illustrating heat and mass flow details for 1 hour operation or 6.25 liters diesel consumption.
Figure 13A:
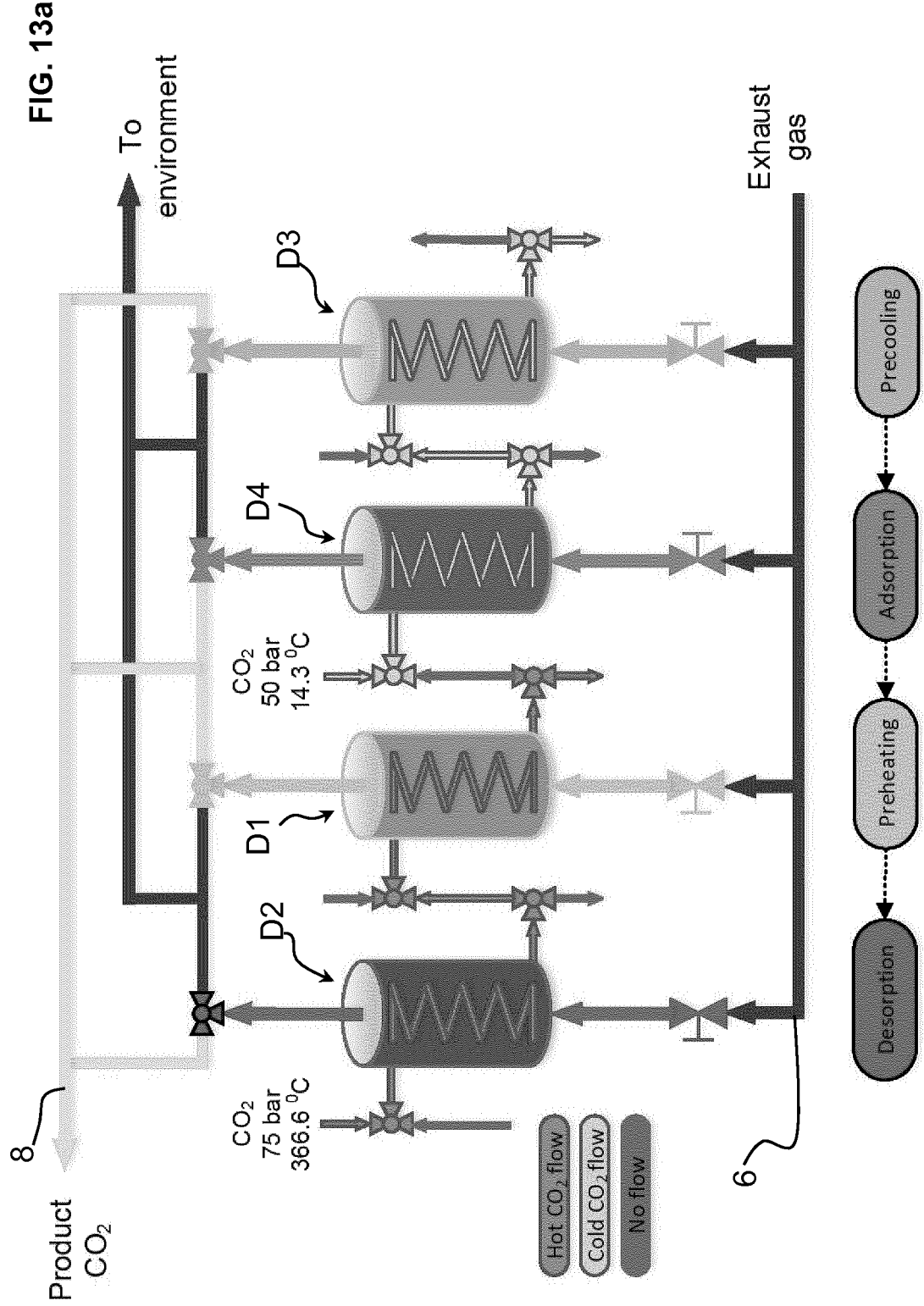
FIG. 13a is a schematic diagram of a first variant of a TSA reactor of a $CO_2$ capture system according to an embodiment of the invention.
Figure 13B:
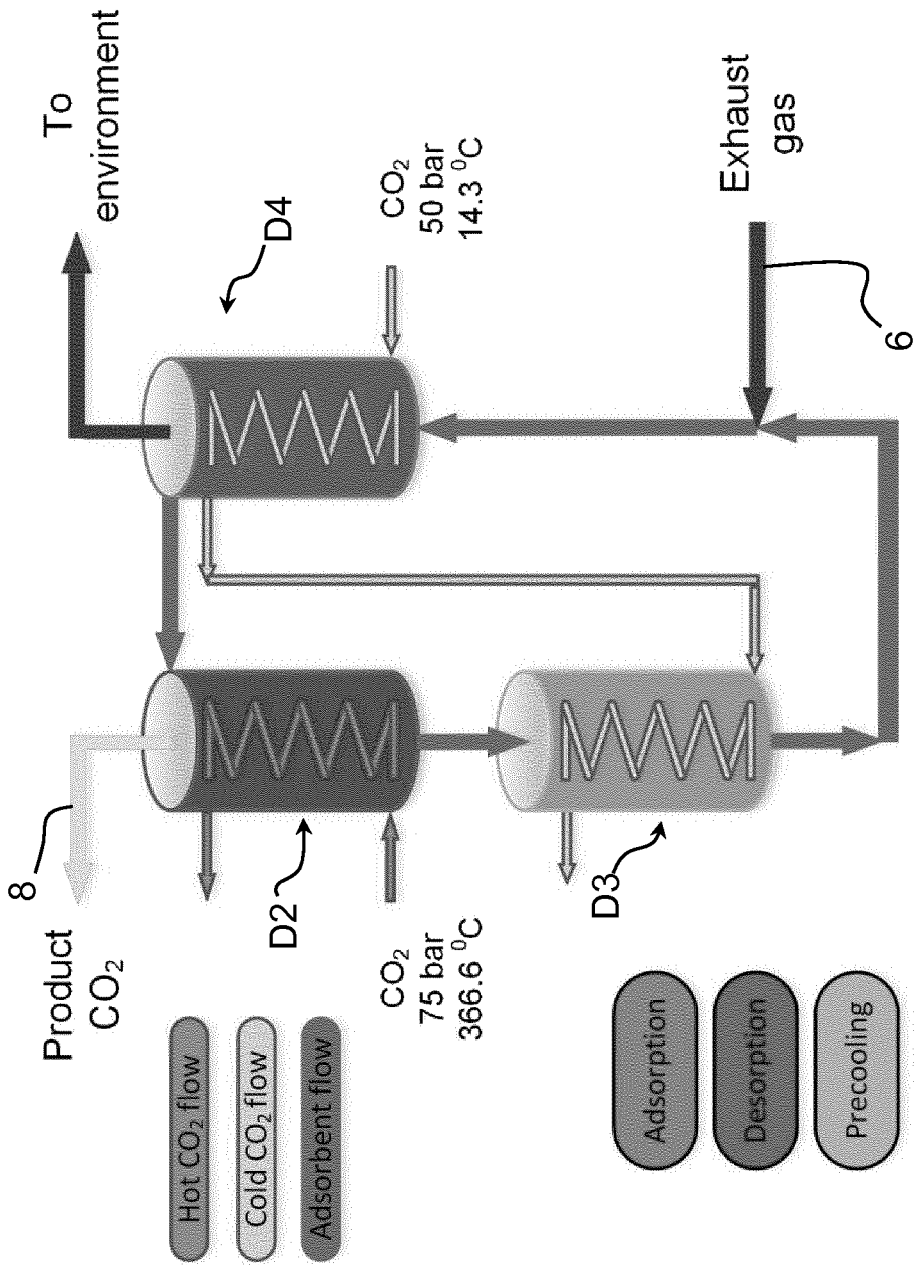
FIG. 13b is a schematic diagram of a second variant of a TSA reactor of a $CO_2$ capture system to an embodiment of the invention.

FIG. 11 presents composite and grand composite curves for cooling of exhaust gas stream, heat of adsorption and precooling, heat of desorption and preheating, $CO_2$ based Rankine cycle, $CO_2$ based heat pump, and product $CO_2$ compression. In FIG. 11, no external hot utility is required to close the heat balance which shows the feasibility of the capture system. The composite curves provides minimum energy targets that can be used in the heat exchanger network design. The systematic approach for heat exchanger network design may give a network with many heat exchangers. In order to keep the practical constraints in mind, a simplified preliminary design for $CO_2$ capture system is illustrated in FIG. 12.

Fuel Production Using Captured $CO_2$

The captured $CO_2$ by the system can be used as feedstock to produce gas or liquid green fuels. For 1 day operation of the delivery truck (250 km travel in 8 hours), 105.5 kg of $CO_2$ will be captured by the proposed system. Table 3 presents the conversion of 105.5 kg of $CO_2$ into fuel by co-electrolysis using renewable electricity (Wang et al., 2018). The renewable electricity for $CO_2$ conversion into green fuels can be provided by the PV panels. For calculating total area of PV panels in Switzerland, 400 W/m² average annual solar irradiation (17.28 MJ/day/m²; www.meteoswiss.admin.ch) has been considered in Table 3. Further, solar irradiation to electricity conversion efficiency of 20% has been assumed for the PV panels.

TABLE 2

Details of $CO_2$ capture system specification (1 day operation, 250 km travel, 50 liters diesel consumptions)

| Storage P (bar) T (° C.) | Mechanical Power (MJ) | $CO_2$ Mass (kg) | $CO_2$ Volume (liter) | Adsorbent Mass (kg) | Adsorbent Volume (liter) | Tank Mass (kg) | Total Mass (kg) | Total Volume (liter) |
|---|---|---|---|---|---|---|---|---|
| 75, 25 | 5.44 | 105.5 | 147.96 | 4 × 32.97 | 4 × 40.95 | 150 | 387.4 | 311.8 |

$CO_2$ is captured, compressed, liquefied and stored in a storage tank. The diesel engine consumes 6.25 liters diesel per hour that means 13.19 kg $CO_2$ should be captured per hour (1 liter diesel=2.34 kg $CO_2$ emission≈90% or 2.11 kg $CO_2$ capture, see FIG. 3). Hence, the capture system requires 131.88 kg (163.8 liters) adsorbent. Further, the mass of storage tank is 150 kg (typical liquid $CO_2$ cylinders) to store 105.5 kg (~148 liters) liquid $CO_2$. The capture system has been simulated in flowsheeting software Belsim Vali. $CO_2$ based Rankine cycle (160 and 75 bar) is used to extract heat from the exhaust gas stream, and to produce the mechanical power in a turbine. This mechanical power is used in $CO_2$ based heat pump (75 and 50 bar) to generate cold utility for removing heat of adsorption from bed and precooling of bed from desorption temperature to adsorption temperature. Further, heat rejected from $CO_2$ based Rankine cycle is used for supplying heat of desorption and preheating of bed from

TABLE 3

Conversion of captured $CO_2$ (105.5 kg from 1 day operation of delivery truck) into green fuels

|  | Methane | Methanol | DME | Gasoline |
|---|---|---|---|---|
| Fuel, kg | 38.89 | 70.35 | 48.94 | 27.11 |
| Power consumptions, MJ | 2582.7 | 2163.7 | 2251.2 | 1983.2 |
| Photovoltaic panels area (Switzerland), m² | 747.3 | 626.1 | 651.4 | 573.8 |

The delivery truck consumes 50 liters (41.6 kg) diesel per day, or 1885 MJ energy based on the lower heating value of diesel. Assuming same efficiency of the engine for different fuels, Table 4 presents amount of alternate fuel used, $CO_2$ produced, $CO_2$ captured, fuel produced using captured $CO_2$, renewable energy consumed and PV panel area.

TABLE 4

Use of alternate fuels in the delivery truck (250 km travel in 8 hours)

|  | Methane | Methanol | DME | Gasoline |
|---|---|---|---|---|
| Fuel Used, kg | 37.7 | 94.7 | 65.2 | 43.4 |
| $CO_2$ Produced, kg | 103.7 | 130.2 | 124.8 | 134.1 |
| $CO_2$ Captured (90%), kg | 93.3 | 117.2 | 112.3 | 120.7 |
| Fuel Produced using Captured $CO_2$, kg | 34.4 | 78.2 | 52.1 | 31.0 |
| Energy Content of Fuel Produced, MJ | 1719.6 | 1555.6 | 1505.6 | 1346.2 |
| Renewable Energy Consumed in Fuel Production, MJ | 2284.2 | 2404.1 | 2396.3 | 2268.9 |
| Power to fuel efficiency, % | 75.3 | 64.7 | 62.8 | 59.3 |
| Photovoltaic panels area (Switzerland), $m^2$ | 660.9 | 695.6 | 693.4 | 656.5 |

The above examples present a system for $CO_2$ capture from exhaust stream of a truck engine. The system design includes integration of temperature swing adsorption, Rankine cycle, heat pump (i.e., cold generation) and $CO_2$ liquefaction on the delivery truck. The proposed system design advantageously has energy self-sufficiency, as it converts waste heat available in the exhaust stream into mechanical energy to drive the heat pump compressor and product compressor.

The system design is an attractive solution due to its low weight and low volume. For daily operation of a delivery truck, the total mass and volume of the adsorbent beds, storage tank and captured $CO_2$ are for instance about 387.4 kg and 311.8 liters. Average gross weight of a delivery truck is for instance about 8000 kg, and so the added extra weight of the $CO_2$ capture system (adsorbent beds and storage tank) will be about 3.5% of the gross weight of delivery truck. Further, some additional weight and space will be required for piping, turbo-compressors, micro-channel heat exchangers. In general, more than 2 $m^3$ space is available over the truck cabin. Hence, a temperature swing adsorption based $CO_2$ capture system according to the invention can easily be placed for instance over the truck cabin or in another location on a vehicle.

The captured $CO_2$ can be utilized for the storage of renewable energy by converting product $CO_2$ into green fuels using co-electrolysis, whereby around 90% of the carbon present in the fuel can be recycled as green fuels. Hybrid buses have reduced fuel consumption (23.4-42.9% reduction) and emissions (CO reduction: 32-59.5%, HC reduction: 56.3-75.3%, NOx reduction: 17.8-38.7%, PM reduction: 50.8-97.1%) compared to the conventional buses. The $CO_2$ capture system can also be used in the hybrid buses to further reduce the $CO_2$ emissions allowing a higher share of renewables used in the transport and reducing the fossil $CO_2$ emissions to environment and at the same time to generate cooling by using waste heat available in the engine exhaust stream and cooling system.

LIST OF REFERENCES IN THE DRAWINGS

Combustion engine 1
$CO_2$ capture system 2 for combustion engine exhaust gas
Exhaust gas flow circuit 6
Gas-Liquid separator S1
Heat exchanger circuit 12
Cooling section 12*a*
Expansion valve V1
$CO_2$ gas-liquid separator S2
Heating section 12*b*
Pump P1
Heat exchangers
Primary exhaust gas heat exchanger H1
Heat exchanger H2
Condenser H3
Condenser H3'
Additional exhaust gas heat exchanger H4
Evaporator H5
Evaporator H6
Condenser H7
Compressors 10
Turbocompressors TC1, TC2
First turbocompressor
Second turbocompressor
$CO_2$ output flow circuit 8
$CO_2$ storage tank T1
Temperature swing adsorption reactor 4
Adsorption unit D4
Preheating unit D1
Desorption unit D2
Precooling unit D3

The invention claimed is:

1. System for $CO_2$ capture from a combustion engine comprising
an exhaust gas flow circuit having an inlet end fluidly connected to an exhaust of the combustion engine,
a heat exchanger circuit,
a primary exhaust gas heat exchanger for transferring heat from exhaust gas to fluid in the heat exchanger circuit,
at least one compressor for compressing fluid in a section of the heat exchanger circuit, the compressor driven by thermal expansion of heat exchanger circuit fluid from the primary exhaust gas heat exchanger,
a $CO_2$ temperature swing adsorption (TSA) reactor fluidly connected to an outlet end of the exhaust gas flow circuit, the TSA reactor including at least an adsorption reactor unit and a desorption reactor unit, the heat exchanger circuit comprising a heating section for heating the desorption unit and a cooling section for cooling the adsorption unit, and
further comprising at least a second compressor driven by thermal expansion of heat exchanger circuit fluid from the primary exhaust gas heat exchanger, the second compressor fluidly connected to an outlet of the desorption reactor unit for compressing $CO_2$ output by the desorption unit.

2. System according to claim 1, wherein the fluid in the heat exchanger circuit is, or contains primarily, $CO_2$.

3. System according to claim 1, wherein the heat exchanger circuit is fluidly connected to a $CO_2$ output flow circuit of the TSA reactor and the heat exchanger circuit contains $CO_2$ outputted from the TSA reactor.

4. System according to claim 1, wherein fluid in the heat exchanger circuit is independent of a $CO_2$ output flow circuit of the TSA reactor.

5. System according to claim 1, wherein the at least one compressors are is a turbocompressors.

6. System according to claim 1, wherein the TSA reactor further comprises a preheating unit and a precooling unit, the heating section of the heat exchanger circuit passing through the preheating unit and the desorption unit to heat these units to cause the adsorbed $CO_2$ to be extracted from the adsorbent, and the cooling section of the heat exchanger circuit passes through the precooling unit and the adsorption unit to cool these units below the temperature at which the adsorbent adsorbs the $CO_2$ in the exhaust gas stream.

7. System according to claim 1, wherein the exhaust gas flow circuit comprises a gas-liquid separator upstream of the TSA reactor to extract water from the exhaust gas stream.

8. System according to claim 1, wherein a cooling section of the heat exchanger circuit comprises an expansion valve to lower the temperature and pressure of the heat exchanger circuit gas outputted from a preheating unit of the TSA reactor.

9. System according to claim 1, wherein the TSA reactor comprises an amine doped MOFs adsorbent.

10. System according to claim 1, wherein the TSA reactor comprises adsorbent material on the surface of a fixed bed in each of said reactor units.

11. System according to claim 10, wherein the reactor units are interconnected by fluid flow circuits and valves that may be operated to successively cycle the reactor units through different states from adsorption, preheating, desorption and precooling.

12. System according to claim 1, comprising a $CO_2$ storage tank for collection and storage of outputted $CO_2$.

13. System according to claim 12, wherein the at least one compressor is configured to compress the outputted $CO_2$ at its storage pressure.

14. System according to claim 13, wherein the desorption reactor unit is configured to compress the outputted $CO_2$ by constant volume heating operation.

15. System for $CO_2$ capture from a combustion engine comprising
an exhaust gas flow circuit having an inlet end fluidly connected to an exhaust of the combustion engine,
a heat exchanger circuit,
a primary exhaust gas heat exchanger for transferring heat from exhaust gas to fluid in the heat exchanger circuit,
at least one compressor for compressing fluid in a section of the heat exchanger circuit, the compressor driven by thermal expansion of heat exchanger circuit fluid from the primary exhaust gas heat exchanger, and
a $CO_2$ temperature swing adsorption (TSA) reactor fluidly connected to an outlet end of the exhaust gas flow circuit, the TSA reactor including at least an adsorption reactor unit and a desorption reactor unit, the heat exchanger circuit comprising a heating section for heating the desorption unit and a cooling section for cooling the adsorption unit,
wherein the TSA reactor further comprises a preheating unit and a precooling unit, the heating section of the heat exchanger circuit passing through the preheating unit and the desorption unit to heat these units to cause the adsorbed $CO_2$ to be extracted from the adsorbent, and the cooling section of the heat exchanger circuit passes through the precooling unit and the adsorption unit to cool these units below the temperature at which the adsorbent adsorbs the $CO_2$ in the exhaust gas stream.

16. System according to claim 15, wherein the fluid in the heat exchanger circuit is, or contains primarily, $CO_2$.

17. System according to claim 15, wherein the heat exchanger circuit is fluidly connected to a $CO_2$ output flow circuit of the TSA reactor and the heat exchanger circuit contains $CO_2$ outputted from the TSA reactor.

18. System according to claim 15, wherein fluid in the heat exchanger circuit is independent of a $CO_2$ output flow circuit of the TSA reactor.

19. System according to claim 15, wherein the at least one compressor is a turbocompressors.

20. System according to claim 15, wherein the exhaust gas flow circuit comprises a gas-liquid separator upstream of the TSA reactor to extract water from the exhaust gas stream.

21. System according to claim 15, wherein a cooling section of the heat exchanger circuit comprises an expansion valve to lower the temperature and pressure of the heat exchanger circuit gas outputted from a preheating unit of the TSA reactor.

22. System according to claim 15, wherein the TSA reactor comprises an amine doped MOFs adsorbent.

23. System according to claim 15, wherein the TSA reactor comprises adsorbent material on the surface of a fixed bed in each of said reactor units.

24. System according to claim 23, wherein the reactor units are interconnected by fluid flow circuits and valves that may be operated to successively cycle the reactor units through different states from adsorption, preheating, desorption and precooling.

25. System according to claim 15, comprising a $CO_2$ storage tank for collection and storage of outputted $CO_2$.

26. System according to claim 25, wherein the at least one compressor is configured to compress the outputted $CO_2$ at its storage pressure.

27. System according to claim 26, wherein the desorption reactor unit is configured to compress the outputted $CO_2$ by constant volume heating operation.

* * * * *